(12) United States Patent
Tan et al.

(10) Patent No.: US 10,392,130 B2
(45) Date of Patent: Aug. 27, 2019

(54) AUTOMATIC PASSENGER BOARDING BRIDGE DOCKING SYSTEM

(71) Applicant: SINGAPORE TECHNOLOGIES DYNAMICS PTE LTD, Singapore (SG)

(72) Inventors: Hong Soon Tan, Singapore (SG); Chee Hwee Toh, Singapore (SG); Han Leong Tan, Singapore (SG)

(73) Assignee: SINGAPORE TECHNOLOGIES DYNAMICS PTE LTD, Singapore (SG)

( * ) Notice: Subject to any disclaimer, the term of this patent is extended or adjusted under 35 U.S.C. 154(b) by 0 days.

(21) Appl. No.: 15/763,360

(22) PCT Filed: Aug. 15, 2016

(86) PCT No.: PCT/SG2016/050392
§ 371 (c)(1),
(2) Date: Mar. 26, 2018

(87) PCT Pub. No.: WO2018/034615
PCT Pub. Date: Feb. 22, 2018

(65) Prior Publication Data
US 2018/0354650 A1    Dec. 13, 2018

(51) Int. Cl.
*E01D 15/00*    (2006.01)
*B64F 1/31*    (2006.01)
(Continued)

(52) U.S. Cl.
CPC ............ *B64F 1/31* (2013.01); *B64F 1/30* (2013.01); *E01D 15/005* (2013.01); *E01D 18/00* (2013.01);
(Continued)

(58) Field of Classification Search
CPC ......... E01D 15/005; E01D 18/00; B64F 1/31; G01S 17/023; G01S 17/48; G05D 3/20
(Continued)

(56) References Cited

U.S. PATENT DOCUMENTS 5,226,204 A    7/1993    Schoenberger et al.
7,137,162 B2    11/2006    Spencer et al.
(Continued)

FOREIGN PATENT DOCUMENTS

WO    WO-01/35327 A1    5/2001

OTHER PUBLICATIONS

International Search Report for PCT/SG2016/050392, ISA/SG, Singapore, dated Nov. 14, 2016.
(Continued)

*Primary Examiner* — Raymond W Addie
(74) *Attorney, Agent, or Firm* — Harness, Dickey & Pierce, P.L.C.

(57) ABSTRACT

A method and apparatus for automatically aligning and connecting a passenger boarding bridge (PBB) with the passenger door of an aircraft or other vessel. A sensory suite module includes cameras and sensors to scan the apron for obstacles and identify an aircraft based on external features. The sensory suite module also includes one or more high-precision active laser line profilers to detect the vertical and lower edges of an aircraft door. A controller module provides precise control and movement of the distal end of the PBB and guides the distal end of the PBB to the passenger door. The system can be activated by a remote triggering panel module.

13 Claims, 6 Drawing Sheets

(51) Int. Cl.
- *B64F 1/30* (2006.01)
- *G01S 17/08* (2006.01)
- *G01S 17/02* (2006.01)
- *G01S 17/89* (2006.01)
- *G01S 17/93* (2006.01)
- *E01D 18/00* (2006.01)
- *G01S 17/48* (2006.01)
- *G05D 3/20* (2006.01)

(52) U.S. Cl.
CPC ............ *G01S 17/023* (2013.01); *G01S 17/08* (2013.01); *G01S 17/48* (2013.01); *G01S 17/89* (2013.01); *G01S 17/933* (2013.01); *G05D 3/20* (2013.01)

(58) Field of Classification Search
USPC .......................................................... 14/71.5
See application file for complete search history.

(56) References Cited

U.S. PATENT DOCUMENTS

| | | |
|---|---|---|
| 8,645,004 B2 | 2/2014 | Anderberg |
| 2002/0104176 A1 | 8/2002 | Thomas et al. |
| 2003/0120358 A1 | 6/2003 | Hutton |
| 2004/0187234 A1 | 9/2004 | Hutton et al. |
| 2006/0288503 A1 | 12/2006 | Hutton |
| 2017/0262732 A1* | 9/2017 | Deng ..................... G01S 17/06 |

OTHER PUBLICATIONS

Written Opinion of the ISA for PCT/SG2016/050392, ISA/SG, Singapore, dated Nov. 14, 2016.
Written Opinion of the IPEA for PCT/SG2016/050392, IPEA/SG, Singapore, dated Feb. 23, 2017.
International Preliminary Report on Patentability for PCT/SG2016/050392, IPEA, Singapore, dated Jun. 19, 2017.

* cited by examiner

AUTOMATIC PASSENGER BOARDING BRIDGE DOCKING SYSTEM

CROSS-REFERENCE TO RELATED APPLICATIONS

This application is a 371 U.S. National Stage of International Application No. PCT/SG2016/050392, filed Aug. 15, 2016. The disclosures of the above application are incorporated herein by reference.

TECHNICAL FIELD

The invention relates to a passenger boarding bridge docking system and, in particular, a fully automated passenger boarding bridge docking system that determines the position of an aircraft door using a high precision active laser line profiler to detect its vertical and lower edges.

BACKGROUND

In the past, movable staircases were used to allow passengers to board and alight an aircraft. Passengers exited an airport terminal and walked along and sometimes across a portion of a fairway or runway. This exposed passengers to outdoor elements and airport traffic as well as requiring them to climb a steep flight of stairs with carry-on baggage. While movable staircases are still used in some airports, they have largely been replaced with Passenger Boarding Bridges.

A Passenger Boarding Bridge (PBB) is an enclosed, movable connector that extends from an airport terminal gate to an airplane, and in some instances from a port to a boat or ship. It allows passengers to board and disembark without going outside or being exposed to the elements. PBBs improve passenger access to aircraft and enhance the security of terminal operations. A PBB may also be known as a jet-bridge, jet-way, gangway, aerobridge/air-bridge, air jetty, portal or sky-bridge.

Depending on building design, sill heights, fueling positions, and operational requirements, a PBB may be fixed or movable. A movable PBB is often attached at one end by a pivot (or rotunda) to the terminal building and has the ability to swing left or right. The cabin, at the distal end of the loading bridge, may be raised or lowered, extended or retracted, and may pivot to accommodate aircraft of different sizes. These motions are controlled by an operator's station in the cab. The cab often has an accordion-like canopy, which allows the bridge to dock with aircraft with differing shapes, and provides a seal from outdoor elements. While the design of PBBs has improved, there are inherent problems with their operation and safety.

A PBB must be operated by a trained employee or member of the airport ground crew, thus requiring manpower that could be used for another function. Usually a ground crew has only a few members who are trained to operate a PBB. A crewman must put other work aside to operate the docking or retraction process. If a trained crewman is not readily available, the passengers and airline crew must wait for one. This can lead to delay in boarding and alighting when multiple aircraft arrive or intend to depart within a short period of time or with inadequate staffing. Even a relatively short delay can cost an airline thousands of dollars in labor and fuel. It can also lead to missed connections and discontent passengers.

The operation of PBBs is also susceptible to human error which can pose dangers and hazards to aircraft. There are several documented cases wherein mistakes by crewman caused damage to an aircraft and PBB. Even with a series of safety checks and operation protocols, workers inevitably make errors due to fatigue, haste and distraction. A PBB can cause millions of dollars in damage if driven into a component of an aircraft or into a foreign object on the fairway. Further, conventional PBBs can be difficult to operate.

Because of limited visibility from the cab, a PBB can be inadvertently driven into a structure or object. Safe docking requires a clear line of sight from the cab to the aircraft door. Precipitation, fog, haze, dust or inclement weather can obstruct the operator's view. In many airports, particularly in large urban environments, haze has become commonplace. Moreover, if a bridge is not fully retracted before departure, it can contact parts of the moving aircraft and cause damage. In may impossible to visually determine whether a PBB is fully retracted in darkness or with poor visibility, Attempts have been made toward improving PBBs and their operation. For example, U.S. Pat. No. 5,226,204 describes a PBB that includes sensors and a telerobotic control apparatus for aligning the end of the PBB with the door of an aircraft. However, this system can be ineffective during inclement weather and when visibility is poor. Further, it requires the time and attention of a trained ground crewman. U.S. Pat. No. 8,645,004 describes an automated PBB that can be programed to connect with a particular make and model of a plane. However, this system is prone to error and requires accurate data on every make and model of plane that arrives at the terminal. Further, the plane must be precisely positioned for the PBB to connect without misaligning.

Other designs require visual markings on aircraft to identify the location of the passenger door. Such a method is described in U.S. Pat. No. 7,137,162 wherein "targets" are affixed to an aircraft fuselage that are used to guide a passenger bridge into contact with the passenger door. This system is also problematic as the markings are susceptible to lighting conditions and can be obscured in fog, haze or rain. Further, an airport authority would have to outfit all aircraft with these "targets." Doing so would require all aircraft companies and pertinent regulatory agencies to accept the system. Moreover, the airport would have to maintain conventional PBBs for aircraft that did not have the visual markings.

Because of these limitations, there is a need for an improved PBB docking system. Specifically, there is a need for a fully automated computerized aircraft PBB docking system that is safe and efficient, eliminates human error and is reliable regardless of visibility.

SUMMARY

The invention recognizes that there exists a long felt need for a PBB that is reliable, efficient, does not require an operator, is not susceptible to human error and is reliable regardless of poor visibility, haze or inclement weather.

The following summary is provided to facilitate an understanding of some of the innovative features unique to the disclosed embodiment and is not intended to be a full description. A full appreciation of the various aspects of the embodiments disclosed herein can be gained by taking into consideration the entire specification, claims, drawings and abstract as a whole.

We describe a system for joining the distal end of a passenger boarding bridge with an aircraft passenger door. The system includes a sensory suite module, a controller module and a triggering module.

The sensory suite module can include a means of aircraft scanning and identification, a means of detecting obstacles near the embarking point or apron and a means of detecting the location of an aircraft door. The controller module can include a motor driver, a position sensor and an encoder. The triggering module can include a remote docking trigger and an LCD panel.

The sensory suite module can also include one or more three-dimensional scanners to identify an aircraft by detecting its external features. It can include one or more imaging systems to detect obstacles and hazards within an apron or other defined area. It can also include one or more lasers to detect the gap between the aircraft fuselage and the aircraft door and to measure the distance between the passenger boarding bridge and the aircraft door. The sensory suite module can also include one or more imaging systems to detect obstacles and hazards within an apron or other defined area.

The triggering module can include one or more remote switches that activate the sensory suite module and the controller module. The triggering module can activate the sensory suite module and the controller module. The controller module can operate one or more actuators to drive the distal end (the entrance) into contact or substantially into contact with the door of the aircraft.

We also describe an aircraft passenger door detection system that includes a sensory module, a controller module and a triggering module. The triggering module can activate the sensory module to scan and locate an aircraft door by identifying the gap between the aircraft fuselage and the aircraft door. The controller module can activate and drive the distal end of the passenger boarding bridge into contact with the door.

We also describe a method of connecting a passenger boarding bridge with the door of an aircraft comprising the steps of (1) scanning the apron or other defined area for obstacles and hazards before arrival of the aircraft, (2) scanning physical characteristics of an aircraft to identify the type or model, (3) comparing the identity of an aircraft with airport schedule data, (4) determining whether an aircraft is properly parked, (5) scanning the aircraft fuselage to detect the physical gap between the aircraft passenger door and the aircraft body, (6) computing the shortest path to move the attaching end of a passenger boarding bridge to the aircraft passenger door, (7) driving the attaching end of the passenger boarding bridge to the passenger door of the aircraft and (8) bringing the passenger boarding bridge within contact or substantially within contact of the aircraft fuselage.

Close range proximity sensors can operate the passenger boarding bridge when it is within approximately 0.5 meters of the passenger door. One or more laser line scanners can be used to detect the physical gap between the aircraft passenger door and the aircraft body.

We also describe a method of locating the passenger door of an aircraft that includes detecting the physical gap between an aircraft passenger door and the aircraft body and performing data filtering to remove noise caused by interferences. Software processing techniques including multi-echo processing and multi-scan averaging can be applied to the laser scans to enhance the detection of the door gap.

Further, we describe a method of locating the passenger door of an aircraft that includes scanning the fuselage to detect the physical gap between the aircraft passenger door and the aircraft body. Data filtering can be performed to remove noise caused by interferences. Software processing techniques including multi-echo processing and multi-scan averaging can be used to enhance the detection of the door gap.

INTRODUCTION

A first aspect of the invention is a sensory suite module that can include (1) an aircraft scanning and identification component, (2) a door position sensor component, (3) a proximity sensor component, (4) an obstacle detection component, (5) a video surveillance component and (6) an industrial embedded computer.

A second aspect of the invention is a door position sensor component that can include one or more laser-based line scanners, laser-based three dimensional (3D) scanners and laser-based proximity sensors and video cameras.

A third aspect of the invention is of the invention is a PBB controller module that can include (1) a closed loop controller component, (2) a motor driver, (3) a position sensor and encoders, (4) a safety monitoring component, (5) a built-in test component and an embedded computer.

A fourth aspect of the invention is a remote triggering panel module that can include a remote docking trigger, a motor driver, an LCD panel and an emergency stop button.

A fifth aspect of the invention is a PBB that can operate by (1) scanning an area to ensure that no obstacles or people are present, (2) confirming the identity of an aircraft and that it is properly positioned/parked, (3) determining the shortest path to move the PBB front cab and (4) using a system of checks/confirmations to bring the cab to within 10 mm of aircraft passenger door.

A sixth aspect of the invention is a remote triggering panel module that allows a member of the airport ground crew to activate the docking and retraction process of the PBB.

A seventh aspect of the invention is a method of connecting the end of a PBB to an aircraft door that does not rely on a passive imaging system (e.g. CCD, CMOS, UV or IR) and is not susceptible to darkness, precipitation, haze or airborne particles or inclement weather.

An eighth aspect of the invention is a method of connecting the end of a PBB to an aircraft door that uses close range proximity sensors to operate the passenger boarding bridge when it is within approximately 0.5 meters of the passenger door.

Other aspects of the invention will become apparent from the following detailed description which, when taken in conjunction with the accompanying drawings, illustrate by way of example some of the aspects of the invention.

BRIEF DESCRIPTION OF THE FIGURES

The drawings described herein are for illustrative purposes only of selected embodiments and not all possible implementations, and are not intended to limit the scope of the present disclosure.

The summary above, as well as the following detailed description of illustrative embodiments, is better understood when read in conjunction with the appended drawings. For the purpose of illustrating the disclosure, exemplary constructions of the disclosure are shown in the drawings. However, the disclosure is not limited to specific methods and instrumentalities disclosed herein. Moreover, the drawings are not to scale. Wherever possible, like elements have been indicated by identical numbers.

DETAILED DESCRIPTION OF THE INVENTION

Definitions

While the invention is primarily described for use with aircraft and airport applications, it is understood that the present invention is not so limited and may be employed in settings other than airports. It may also be scaled up or down to suit the size of different vessels and components. Other applications include, for example, but not limited to, the use of the system with ships, boats, buses, spacecraft and/or military vehicles. In addition, the system can be used for ground handling operations including the docking of a food or catering truck with a vessel's service doors, the docking of a cargo handling vehicle with a vessel's cargo door and/or docking a staircase with a vessel's passenger door.

Reference in this specification to "one embodiment/aspect" or "an embodiment/aspect" means that a particular feature, structure, or characteristic described in connection with the embodiment/aspect is included in at least one embodiment/aspect of the disclosure. The use of the phrase "in one embodiment/aspect" or "in another embodiment/aspect" in various places in the specification are not necessarily all referring to the same embodiment/aspect, nor are separate or alternative embodiments/aspects mutually exclusive of other embodiments/aspects. Moreover, various features are described which may be exhibited by some embodiments/aspects and not by others. Similarly, various requirements are described which may be requirements for some embodiments/aspects but not other embodiments/aspects. Embodiment and aspect can be in certain instances be used interchangeably.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The term "actuator" refers to a mechanical device for moving or controlling something. An actuator requires a control signal and a source of energy.

The term "aircraft marshalling" refers to the visual signaling between ground personnel and pilots on an airport, aircraft carrier or helipad.

The term "air traffic control" or "ATF" refers to the ground-based personnel and equipment concerned with controlling and monitoring air traffic within a particular area.

The term "apron" refers to the area of an airport where aircraft are parked, unloaded or loaded, refueled, or boarded. Although the use of the apron is covered by regulations, such as lighting on vehicles, it is typically more accessible to users than the runway or taxiway.

The term "cab" refers to a part of a vessel (in this case a passenger boarding bridge or jet-bridge) that houses an operator and operating controls.

The term "closed loop control system" refers to a system where the actual behavior of the system is sensed and then fed back to the controller and mixed with the reference or desired state of the system to adjust the system to its desired state.

The term "distal" refers to being situated away from the center of an object, body or point of attachment. In the context of a PBB, the distal end refers to the end that attaches to the door of an aircraft. It can also be referred to as the cabin of the PBB.

The term "foreign object debris" or "FOD" refers to a substance, debris or article alien to a vehicle or system which would potentially cause damage, particularly in an airport or aerospace setting.

The term "proximal" refers to being situated close to or toward the center of an object, body or point of attachment. In the context of a PBB, the proximal end refers to the base or section closest or adjacent to the airport.

The term "Visual Docking Guidance System," "VDGS" or "A-VDGS" refers to a stand guidance system that provides information to a pilot attempting to park an aircraft at an airport stand, usually via visual methods.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention. Other technical terms used herein have their ordinary meaning in the art that they are used, as exemplified by a variety of technical dictionaries.

Description of Preferred Embodiments

The invention provides a system and method for automatically aligning and connecting a passenger boarding bridge (PBB) with the passenger door or hatch of an aircraft or other vessel. In a preferred embodiment, a remote triggering panel module activates a controller module that guides the distal end of the PBB to the hatch of the aircraft.

The invention exploits a characteristic that is universally common to most commercial aircraft. The passenger doorway on an aircraft must come outward before it slides to the side or slides upward into the fuselage. Because of manufacturing tolerance and to allow the door to properly open and close, there is a gap between the door panel and the fuselage. The sensory suite module uses laser technology to detect this narrow gap. It uses one or more high-precision active laser line profilers to detect the vertical and lower edges of an aircraft door. This technique is more reliable than conventional methods that depend on two-dimensional passive imaging because it is not susceptible to changes in background lighting nor to the clutter caused by a complex or paint scheme on an aircraft.

Figure 1:
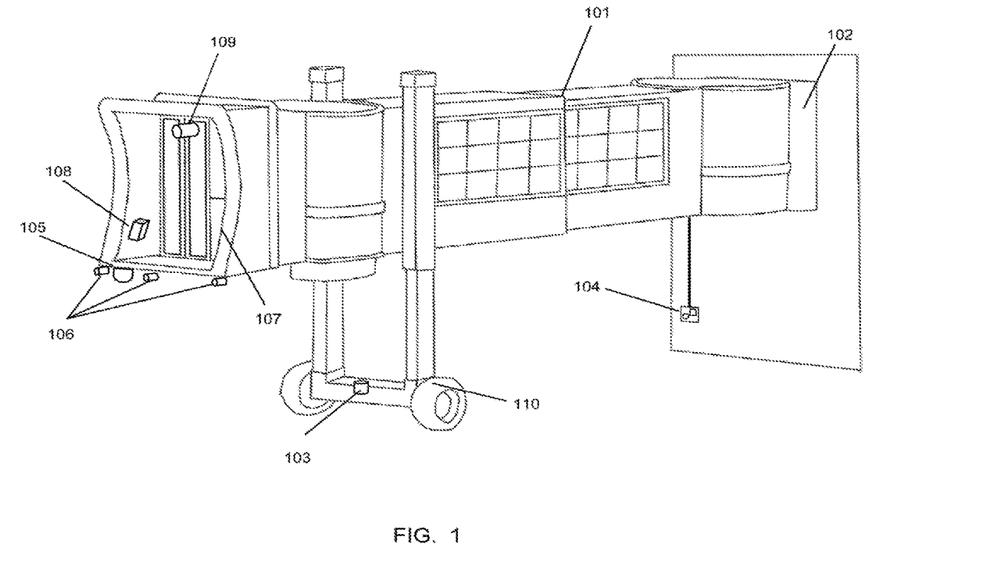
FIG. 1 depicts a perspective view of a conventional PBB that includes the Fully Automatic PBB Docking System.

FIG. 1 is an illustration of a conventional PBB that includes the fully automatic PBB docking system and several of its components. The proximal end of the PBB is connected to the passenger terminal 102. The PBB can include a rotunda (not shown) to allow the PBB to extend at a range of angles from the passenger terminal. The body of the PBB 101 forms a hallway or passageway as it extends from the passenger terminal. It can be driven by the PBB motion control 110.

The Obstacle Detection Component 103 is preferably located near the base of the distal end of the PBB. It can include one or more active or passive imaging systems and object detection software to detect objects or hazards in the apron. In a preferred mode of operation, the Obstacle Detection Component 103 begins scanning the apron prior to the arrival of an aircraft. If a foreign object or hazard is detected, the system can send an alert and prevent further movement of the PBB.

Upon the arrival of an aircraft, a member of the ground crew can activate the docking process using controls at the Remote Triggering Panel Module 104. Here, the Remote Triggering Panel Module is mounted on the passenger terminal near the proximal end of the PBB. The Aircraft Scanning and Identification Component (ASIC) 105 can use a three-dimensional (3D) active scanning sensor to detect the external features of the aircraft. Based on information from the scan, it can identify the aircraft and confirm its scheduled arrival with airport operations.

The Video Surveillance Component 109 can provide a live or "real-time" view of the inside of the PBB and an external view surrounding the PBB front cab. This can be displayed on one or more monitors for ground crew members or air traffic control. The Industrial Embedded Computer 107 can process the sensory data compiled from the sensors in the Sensory Suite Module and the computation of the aircraft door position to be sent to the PBB Controller Module.

The Proximity Sensor Component 106 can use onedimensional active laser sensors to measure the distance between the PBB and the aircraft fuselage. These sensors can be mounted below the PBB cab at the far end of the bumper to detect the distance between the PBB docking components and the aircraft fuselage. The Door Position Sensor Component 108 can use one or more lasers to detect the gap (vertical and horizontal edges) between the door and the fuselage. The system can move the distal end of the PBB to within 10 millimeters of the gap in the final phase of the docking process. After which, the end of the PBB can lowered until it contacts the fuselage.

Figure 2:
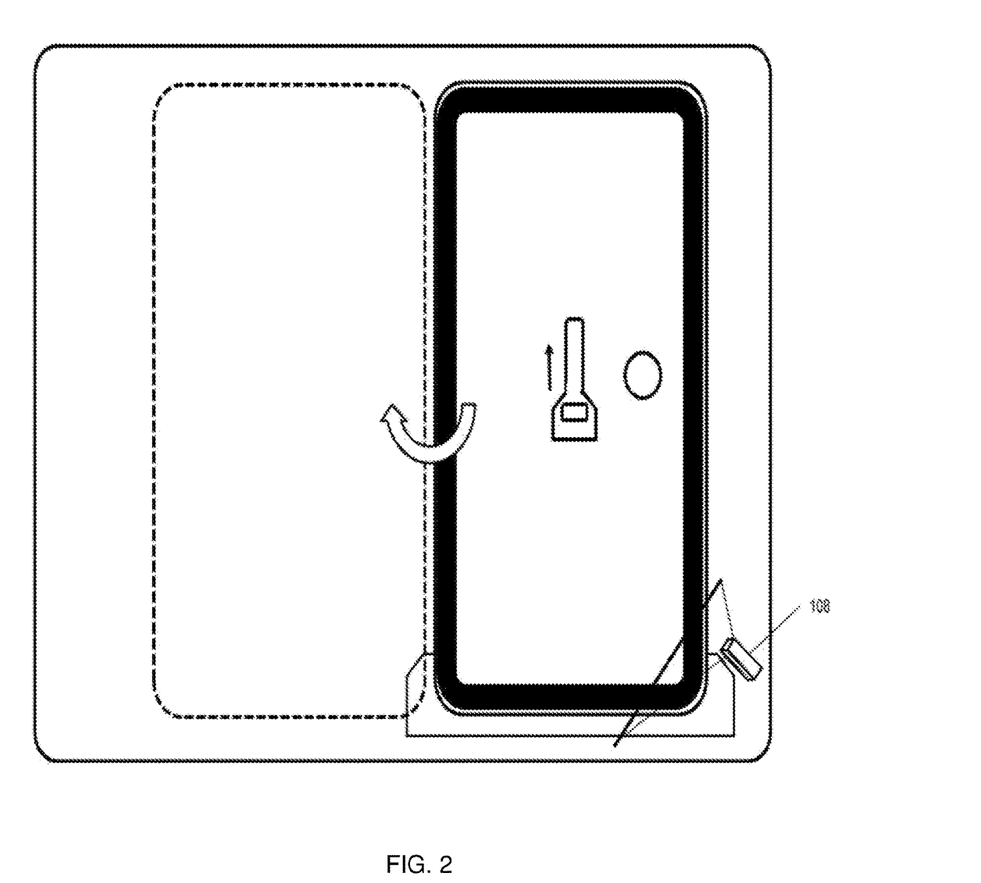
FIG. 2 depicts a passenger door of an aircraft and the door position sensor component of the invention.

FIG. 2 depicts the section of an aircraft fuselage that includes a passenger door. The arrow depicts the direction that the door opens. The hatched line indicates the position of the door when opened. The door position sensor component is also depicted 108. A laser profiler (not shown) is used to indicate the position of the gap between the door and the fuselage. The system determines the precise location of the gap. Thereafter, it can drive the distal end of the PBB to the location.

Figure 3A:
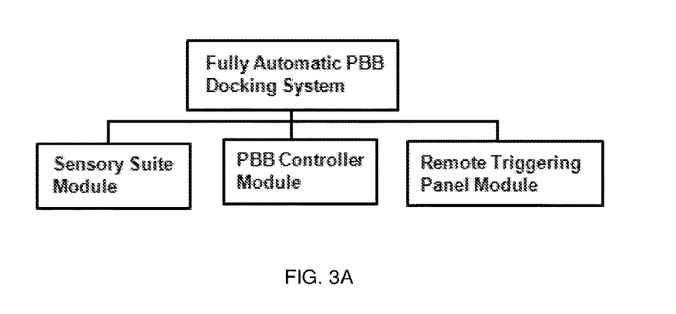
FIG. 3A depicts the three modules of the Fully Automatic PBB Docking System.

FIG. 3A depicts the fully automatic PBB docking system which includes three main modules: a sensory suite module, a PBB controller module and a remote triggering panel module. Each module can be further described by detailing its respective components and functions.

The Sensory Suite Module can include laser-based line scanners, laser-based three-dimensional (3D) scanners, laser-based proximity sensors and video cameras. They can be mounted in the cabin of the Passenger Boarding Bridge (PBB) and externally-oriented, to provide close-proximity sensing of the aircraft, detection of aircraft passenger door position, detection of obstacles below the PBB, detection and identification of aircraft features, and video surveillance of the surrounding area inside and outside the PBB.

The PBB Controller Module can include a motion control system that is composed of an arrangement of embedded computers, switches, relays, motors and servo-controllers that provide precision control of the movement of the PBB. The Remote Triggering Panel Module can be mounted externally on the PBB and used for activating the PBB auto-docking process.

Figure 3B:
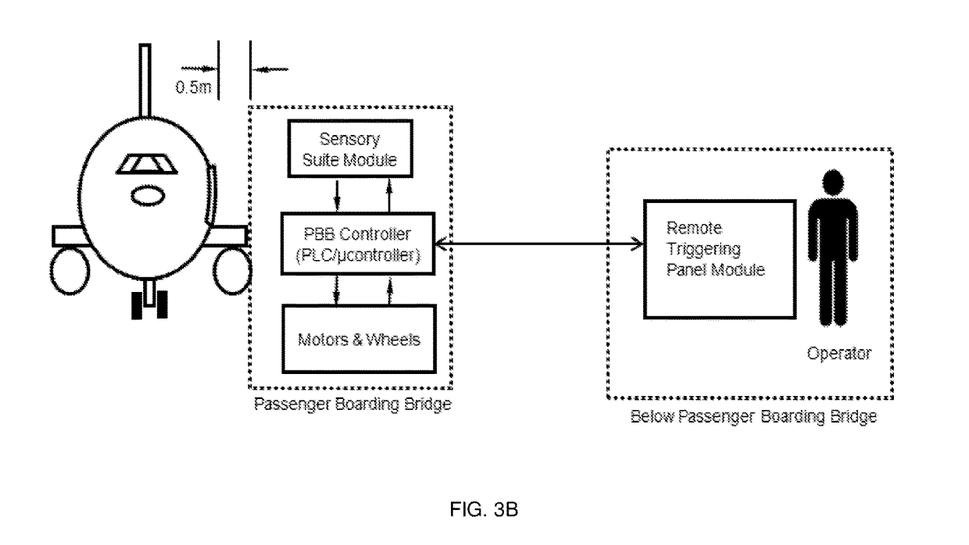
FIG. 3B depicts an aircraft and PBB, the PBB equipped with the Fully Automatic PBB Docking System and controlled remotely.

FIG. 3B depicts an aircraft and PBB. It shows the interconnectivity between components of the system. The operator is depicted at a remote location. The remote triggering panel module can be operated by a member of the ground crew near the apron or intended parking spot of the aircraft. In the alternative, the module can be located further away in a control center or air traffic control center.

The 0.5 m (500 mm) interspace is also depicted in the figure. In one embodiment, the PBB docking process includes two phases. In phase one, the sensory suite module identifies the aircraft and confirms that it is properly parked. The PBB controller calculates a direct route to the aircraft passenger door and moves the end of the PBB to within 0.5 meters of this point.

In phase two, the sensory suite module activates close range proximity sensors in the door position sensor component. It uses one or more lasers to detect the gap (vertical and horizontal edges) between the door and the fuselage. It moves the end of the PBB to within 10 millimeters of the gap. At this point, the end of the PBB is lowered until it contacts the fuselage.

In the event that the close range proximity sensors do not detect the gap, the PBB can continue to move to (0.3 meters) 300 millimeters away and make another attempt. If it does not detect the gap at 300 mm, the system can trigger an alert to the ground operator at the PBB or to a remote central controller. At this point, the ground operator can choose to take control of the PBB manually.

Sensory Suite Module

Figure 4A:
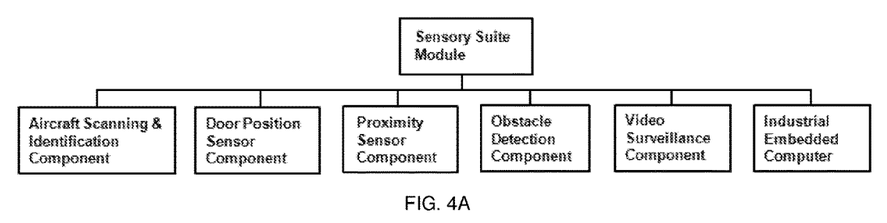
FIG. 4A depicts components of the Sensory Suite Module.

FIG. 4A depicts several components and functions of the Sensory Suite Module. It can include an Aircraft Scanning and Identification Component (ASIC) that uses a three-dimensional (3D) active scanning sensor to detect the external features of the aircraft or a part of the aircraft. Thereafter, it can match the scanned profile to a number of templates stored in a database to decipher the model of the aircraft. When the aircraft model has been identified, the information can be correlated with information provided by the airport information system to ensure that the correct aircraft is arriving at the gate according to the airport schedule or flight plan. To allow effective operation in inclement weather, the 3D active scanning sensor can be equipped with multi-echo processing technology. This enables proper airplane identification in conditions that include haze, fog, rain and snow.

The sensory suite module can also include a Door Position Sensor Component (DPSC) that can use high precision active laser line profilers to detect the vertical and lower edges of the aircraft door. As discussed, this module is active in the second phase of the docking process, when the end of the PBB is within 0.5 meters of the aircraft fuselage. The sensors provide sufficient resolution to detect the physical gap between the door and surrounding body of the aircraft.

This method of detecting the aircraft door by using the mechanical characteristics of the door-body gap is an alternative to conventional docking operation that require visual markings on the aircraft fuselage. It is more reliable because it is not susceptible to external conditions and variations of aircraft color schemes and exterior designs.

Similar to the ASIC, the DPSC can use software filters to improve its efficacy and sensitivity. It can use multi-echo processing and the averaging of multiple scans to enhance the detection of the gaps through adverse weather conditions. These software filters can be an essential function to making the sensor suite operational in fog, rain or snow.

In the event of heavy rain that affects the operation of the laser scanner, the system can perform data filtering to remove "noisy" or incomprehensible data caused by rain drops. Such noise filtering can be in the form of profile averaging over multiple scans, multi-echo processing, and outlier rejection methods based on range gating.

The Proximity Sensor Component can use one-dimensional active laser sensors to measure the distance between the PBB and the aircraft fuselage. These sensors can be mounted below the PBB cab at the far ends of the bumper and can detect a potential contact or collision between the PBB and the aircraft during movement.

An Obstacle Detection Component can include one or more active or passive imaging systems and object detection software to determine the presence, location and size of objects in close proximity to the PBB. This prevents activation and movement of the PBB when a foreign object or person is in the vicinity of the path of the PBB.

A Video Surveillance Component can provide a real-time view of the inside of the PBB and an external view surrounding the PBB front cab. This component can be used mainly to ensure safety during operation and use of the PBB. The video can be relayed to one or more screens in an air traffic center.

An Industrial Embedded Computer can process the sensory data compiled from the sensors in the Sensory Suite Module and the computation of the aircraft door position to be sent to the PBB Controller Module.

PBB Controller Module

Figure 4B:
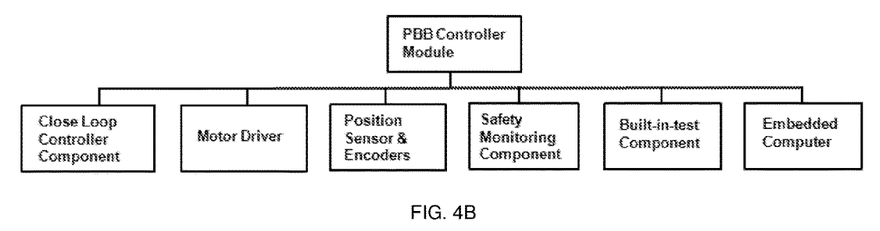
FIG. 4B depicts components of the PBB Controller Module.

FIG. 4B illustrates some of the components of the PBB Controller Module. The PBB Controller Module can provide precision motion guidance and control of the PBB movement based on the output from the Sensory Suite Module. The module can receive and process data related to the aircraft door position and generate the commands for the distal end of the PBB to move toward the aircraft door location for docking.

A Closed Loop Controller can be used to process and compute the position of the aircraft door, send feedback regarding the position to the motion control module and control the movement of the PBB.

A Motor Driver can take in the signals from the Close Loop Controller and generate the actuating current to move the PBB wheels. Position Sensors and Encoders on the joints and axes of the PBB can be used to measure the kinematics of the entire PBB. A Safety Monitoring Component can continuously evaluate movement of the PBB for safety. It can stop the system from moving upon sensing a potentially dangerous object or condition. A Built-in Test Component can continuously monitor the proper functioning of critical components in the system and prevent movement upon detecting any potential fault, failure or impending failure. An Embedded Computer can run the Closed Loop Controller software, generate the control signals, measure the PBB position, and monitor the safety of the PBB functions.

Remote Triggering Panel Module

Figure 4C:
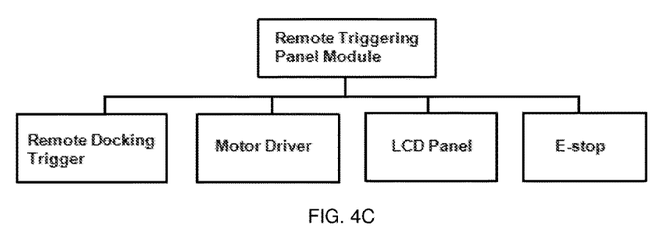
FIG. 4C depicts components of the Remote Triggering Panel Module.

FIG. 4C illustrates some of the components of the Remote Triggering Panel Module. The Remote Triggering Panel Module is designed for an operator to trigger the PBB automatic docking and retraction (undocking) functions with an external switch. In one embodiment, it can use "one-touch" operation to activate the PBB automatic docking and undocking process.

One or more LCD panels can provide visual feedback and indicate, among other things, the operating status of the PBB. The panel can also include an emergency stop button (E-stop) to allow an airport employee or member of the ground crew to immediately stop operation of the PBB in case of an urgent or unforeseen circumstance.

Working Example—Docking of Passenger Boarding Bridge with an Aircraft

Figure 5:
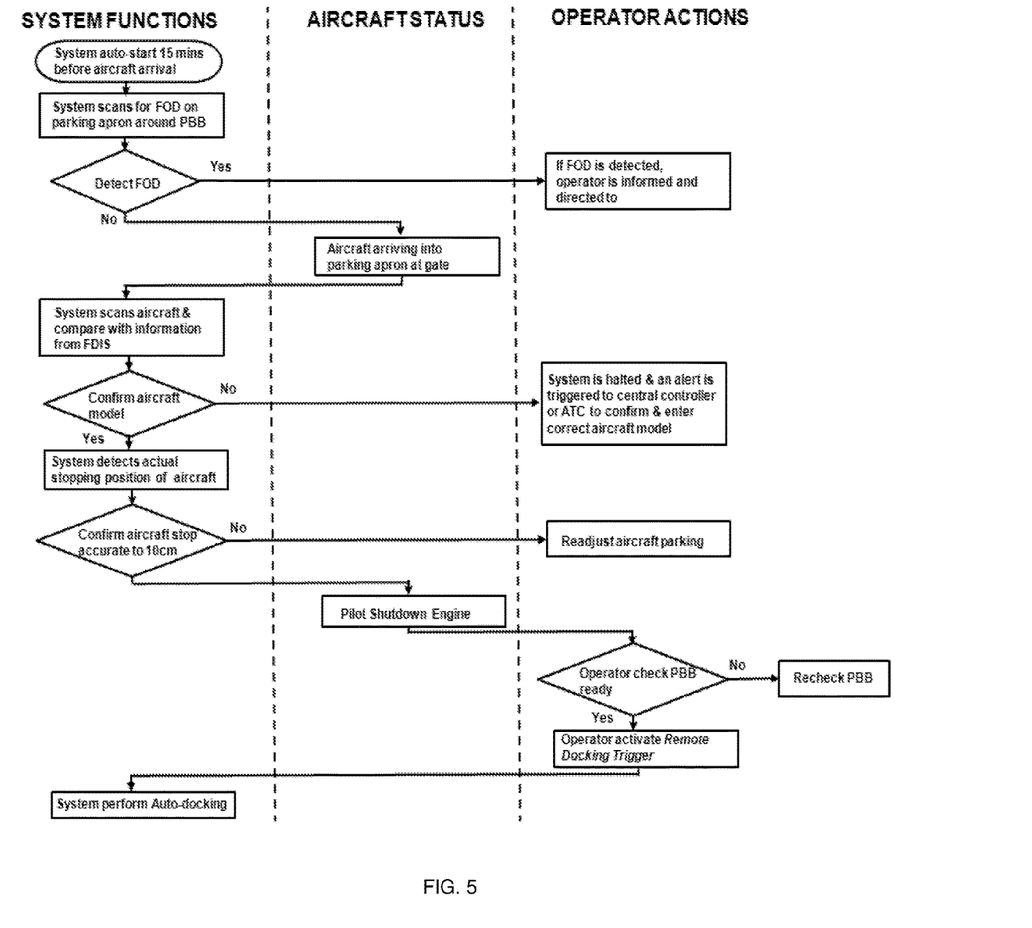
FIG. 5 is a flowchart demonstrating activation of the system and a series of steps conducted prior to docking the PBB.

FIG. 5 is a flow chart that depicts the steps in the process of activating the system. In this example, the system begins by scanning the area around the apron and PBB for obstacles or hazards. In a preferred method of operation, this begins about fifteen minutes before the anticipated arrival of an aircraft.

Foreign Object Damage (FOD) Scanning

The system can scan the apron areas using externally mounted cameras. One or more cameras scan the parking apron for foreign object debris (FOD) and objects above a particular size. This is important for safety and to prevent damage to aircraft, in particular to turbine jet engines. If nothing is detected, the system remains on "stand by" until the aircraft arrives at the gate.

The system can be programed to trigger an alert based on detecting a foreign object of with a minimum size. For example, if it detects an object larger than 300 mm×300 mm, the system can alert the ground operator or other airport employee of the potential hazard. This alert can be in the form of a visual indicator mounted near the PBB or a signal to a central control station.

The system can resume its normal operation when it determines that the apron is clear or after a foreign object is removed. If a foreign object remains inside the apron, the system can send an alert to the central control station or the Air Traffic Control (ATC) to inform the arriving aircraft to delay its entry into the apron or to divert it to another gate.

If the apron is clear and the arriving aircraft is approaching the gate, the aircraft can be guided into its final stopping position by an Aircraft Docking Guidance System (ADGS) or manually by a ground marshal.

Phase I—Aircraft Model Identification and Determination of Aircraft Parking Position After an aircraft has stopped in the apron area, the system can begin phase I of the PBB docking process. It begins with scanning the external body of the aircraft to identify the specific aircraft model. This information is compared with data provided by the Airport Flight Information Service (AFIS) to ensure that the correct aircraft is parked at the apron. If there is a discrepancy between the two sources of information, the system can send an alert to the central controller or ATC to address the discrepancy and/or confirm and enter the correct aircraft model.

After the aircraft model is confirmed, the system can resume with the remaining checks. The checks can include confirming that the aircraft is parked within a particular distance from the designated stopping position for the particular type of aircraft. In this example, the aircraft must be parked within 10 centimeters of a designated area.

Once the aircraft is confirmed to be within the tolerance of the designated parking position, the PBB can be activated to standby and wait for further instructions. This accuracy can be important to ensure that, among other things, the PBB will not obstruct the opening of the passenger door when it is docked to the aircraft. The pilot can be signaled to shut down the aircraft engines.

Figure 6:
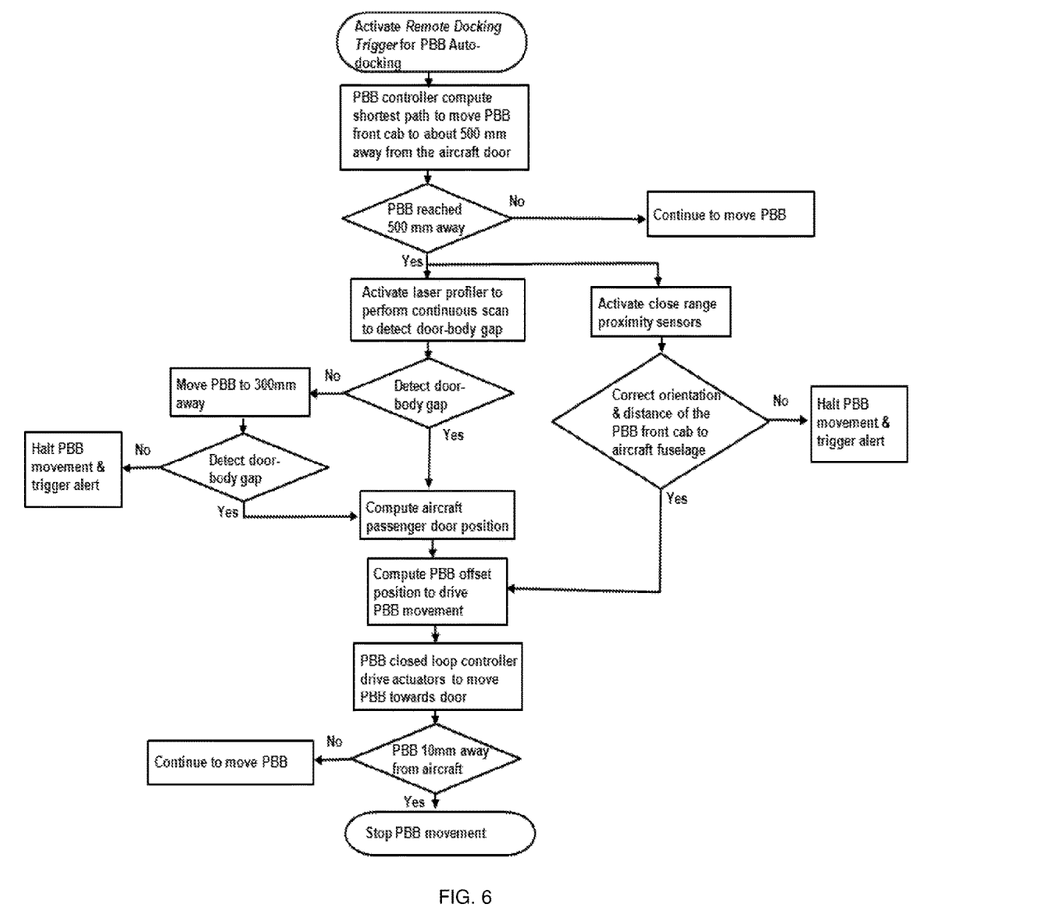
FIG. 6 is a flowchart demonstrating a series of steps conducted by the system in docking the PBB to an aircraft.

FIG. 6 is a flowchart demonstrating a series of steps made by the invention in docking the PBB to an aircraft. After the aircraft is identified and properly parked, a ground operator can confirm with the pilot that the aircraft is ready for the PBB to be docked.

Remote Activation of PBB Final Docking

The ground operator can use the remote panel to confirm that the PBB is ready before activating the Remote Docking Trigger to initiate the automatic docking process. Upon receiving the activation trigger, the system's PBB controller can initiate its motion controls to drive the distal end of the PBB toward the aircraft passenger door for docking.

PBB Motion Control, Door Detection, PBB Proximity and Orientation Sensing

After the system locates and computes the position of the aircraft passenger door, the system can compute the PBB offset position to drive the movement of the PBB. The PBB closed loop controller can drive the actuators (i.e. the motors and wheels that move the PBB toward the aircraft door). The PBB controller can determine the shortest path to move the PBB front cab to approximately (0.5 meter) 500 millimeter away from the aircraft door. It can also keep the cabin floor level and parallel with the aircraft door. In the first phase, the PBB front cab is driven to within (0.5 meter) 500 millimeter from the aircraft.

If the gap is not detected at 500 millimeters, the PBB can continue to move to 300 millimeters away until the gap is detected. If it does not detect the gap at 300 millimeters, it can cease further movement and trigger an alert to the ground operator at the base of the PBB or to a remote central controller. In such an event, the ground operator can choose to take control of the PBB manually. He or she can operate the PBB in a semi-automated mode and guide it into position and then allow the system to take over docking. In the alternative, the ground operator can retract the PBB back to stow position.

As the PBB is moving, the proximity sensing components can monitor the orientation and distance of the PBB front cab to ensure that it remains level with and parallel with the aircraft door.

Phase II—Completion of Docking

The second phase can begin when the distal end of the PBB is within 500 millimeters of the aircraft door. In this phase, the close range proximity sensors and door sensor suite begin to operate. The laser profiler used for door detection can lay a high resolution laser line on the aircraft body covering the edge of the aircraft passenger door. The laser profiler performs a continuous scan to detect the gap in the fuselage that denotes the edge of the passenger door.

In the event that the PBB front cab is skewed toward one side during the movement or is not level with the aircraft door, the system can cease further movement until assistance is rendered. This situation can arise if the aircraft is not properly parked. Otherwise, the system can move the PBB until the bumper is approximately 10 mm away from the aircraft fuselage.

After the PBB front cab has completed docking, the collapsible shelter can be lowered until it contacts the aircraft fuselage. At this point, a member of the aircraft crew can safely open the passenger door. The edge of the PBB can include a latch or sealing device to allow a flight attendant or passenger from the plane to ensure that the PBB is secured to the fuselage before allowing passengers to board or alight.

Undocking Operations

The following retraction sequence can be followed prior to departure or when an aircraft has been serviced and the ground operator wishes to retract the PBB. The FOD laser scanner can check that the aft of the PBB along its retracting path is clear of obstacles. Further, sensors mounted inside the PBB can scan and confirm that there are no occupants inside the cabin or along the tunnel. When both conditions are met, a signal can be displayed on the remote panel to indicate that the PBB is clear for retraction.

The ground operator can initiate the undocking by activating a remote undocking trigger on the remote panel. Upon receiving this signal, the PBB controller can move the PBB to its stowed position while continuing to scan for any obstacles. The PBB will thereafter remain in its stowed or retracted position until it is programmed or activated to begin the docking process again.

Although we have attempted to comprehensively describe the embodiments in detail to cover all possible aspects, those skilled in the art would recognize that other versions of the disclosure are also possible. For example, The invention can also be used in conjunction with another vessel such as a ship or train (not shown) for loading of passengers or freight. In addition, the door detection method can also be applied to other aircraft ground handling operations including the docking of a food catering truck with the aircraft service doors, the docking of a cargo handling vehicle with the aircraft cargo door or the docking of a manual staircase with the aircraft passenger door.

It will be appreciated that variations of the above disclosed automated passenger boarding bridge docking system and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

Although embodiments of the current disclosure have been described comprehensively, in considerable detail to cover the possible aspects, those skilled in the art would recognize that other versions of the disclosure are also possible.

The particular values and configurations discussed in these non-limiting examples can be varied and are cited merely to illustrate at least one embodiment and are not intended to limit the scope thereof.

What is claimed is:

1. A system for joining a distal end of a passenger boarding bridge with an aircraft passenger door including:
   a) a sensory suite module, said sensory suite module comprised of:
   an aircraft scanning identification component for aircraft scanning and identification;
   an obstacle detection component for detecting obstacles near an embarking point or apron;
   a door position sensor component for detecting the edges of the aircraft passenger door, wherein the door position sensor component comprises a laser profiler for detecting vertical and horizontal gaps in the aircraft fuselage that indicates the edges of the aircraft passenger door, wherein the laser profile emits a high resolution laser line covering the edge of the aircraft door and is not susceptible to changes in the background lighting;
   one or more close range proximity sensors to measure the distance between the passenger boarding bridge and the aircraft; and
   software filters that filter data to remove noise caused by fog, rain or snow, wherein the software filters are used by both the aircraft scanning and identification component and door position sensor component; and
   b) a controller module including a motor driver, a position sensor and an encoder;
   c) a triggering module including a remote docking trigger and an LCD panel,
   wherein said triggering module activates the sensory suite module, and
   wherein said controller module operates one or more actuators to drive the distal end of the passenger boarding bridge to the aircraft passenger door.

2. The system of claim 1 wherein the sensory suite module includes one or more three-dimensional scanners to identify the aircraft by detecting its external features.

3. The system of claim 1 wherein multi-echo processing and multi-scan averaging are applied to enhance the detection of the vertical and horizontal gaps in the aircraft fuselage that denotes the edges of the aircraft passenger door.

4. The system of claim 1 wherein the sensory suite module includes one or more imaging systems to detect obstacles and hazards within an apron or other defined area.

5. The system of claim 1 wherein the controller module operates one or more actuators to drive the distal end of the passenger boarding bridge into contact or substantially into contact with the aircraft passenger door.

6. The system of claim 1 wherein the triggering module includes one or more remote switches that activate the sensory suite module and the controller module.

7. An aircraft passenger door detection system comprised of:
   a) a sensory suite module including:
   an aircraft scanning identification component means for aircraft scanning and identification;
   an obstacle detection component for detecting obstacles near an embarking point or apron;
   one or more close range proximity sensors to measure the distance between the passenger boarding bridge and the aircraft;
   a door position sensor component for detecting the edges of the aircraft passenger door, wherein the door position sensor component comprises a laser profiler for detecting vertical and horizontal gaps in the aircraft fuselage that indicates the edges of the aircraft passenger door, wherein the laser profiler emits a high resolution laser line covering the edge of the aircraft door and is not susceptible to changes in background lighting; and
   software filters that perform data filtering to remove noise cause by fog, rain or snow in the air, wherein the software filters are used by the door position sensor component,
   b) a controller module; and
   c) a triggering module,
   wherein said triggering module activates the sensory suite module to scan and locate the aircraft passenger door by identifying the vertical and horizontal gaps in the aircraft fuselage that denotes the edges of the aircraft passenger door, and
   wherein said controller module activates and drives a distal end of a passenger boarding bridge into contact or substantially into contact with the aircraft passenger door.

8. The aircraft passenger door detection system of claim 7 wherein the sensory suite module includes one or more three-dimensional scanners to identify an aircraft by detecting its external features.

9. The aircraft passenger door detection system of claim 7 wherein the sensory suite module includes one or more imaging systems to detect obstacles and hazards within an apron or other defined area.

10. The aircraft passenger door detection system of claim 7 wherein the controller module operates one or more actuators to drive the distal end of the passenger boarding bridge.

11. A method of connecting a passenger boarding bridge with an aircraft passenger door of an aircraft comprising of the steps of:
   a) scanning the apron or other defined area for obstacles and hazards before arrival of the aircraft,
   b) scanning physical characteristics of the aircraft to identify the type or model,
   c) comparing the identity of the aircraft with airport schedule data,
   d) determining whether the aircraft is properly parked,
   e) scanning an aircraft fuselage with a door position sensor component for detecting the edges of the aircraft passenger door, wherein the door position sensor component includes a laser profiler for detecting vertical and horizontal gaps in the aircraft fuselage that indicates the edges of the aircraft passenger door, wherein the laser profiler emits a high resolution laser line covering the edge of the aircraft door and is not susceptible to changes in background lighting and wherein software filters are used by the door position sensor component to remove noise caused by fog, rain or snow by data filtering,
   f) computing the shortest path to move an attaching end of the passenger boarding bridge to the aircraft passenger door,
   g) driving the attaching end of the passenger boarding bridge to the aircraft passenger door,
   h) bringing the passenger boarding bridge within contact or substantially within contact of the aircraft fuselage, wherein one or more close range proximity sensors measures the distance between the passenger boarding bridge and the aircraft.

12. The method of claim 11, wherein multi-echo processing and multi-scan averaging are applied to enhance the detection of the vertical and horizontal gaps in the aircraft passenger door that denotes the edges of the aircraft fuselage.

13. The method of claim 11 wherein data filtering is performed to remove noise caused by interferences.

* * * * *